(12) United States Patent
Naumann et al.

(10) Patent No.: US 11,073,120 B2
(45) Date of Patent: Jul. 27, 2021

(54) FUEL INJECTOR

(71) Applicant: Robert Bosch GmbH, Stuttgart (DE)

(72) Inventors: Rainer Naumann, Bamberg (DE); Johann Bayer, Strullendorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/145,714

(22) Filed: Sep. 28, 2018

(65) Prior Publication Data

US 2019/0032617 A1  Jan. 31, 2019

Related U.S. Application Data

(62) Division of application No. 14/130,244, filed as application No. PCT/EP2012/058993 on May 15, 2012, now Pat. No. 10,113,524.

(30) Foreign Application Priority Data

Jun. 29, 2011 (DE) .................... 10 2011 078 251.6

(51) Int. Cl.
*F02M 61/16* (2006.01)
*B29C 45/14* (2006.01)
*F02M 61/04* (2006.01)
*F02M 51/00* (2006.01)

(52) U.S. Cl.
CPC .......... *F02M 61/168* (2013.01); *B29C 45/14* (2013.01); *B29C 45/14065* (2013.01); *B29C 45/14598* (2013.01); *B29C 45/14622* (2013.01); *F02M 61/04* (2013.01); *F02M 51/005* (2013.01); *F02M 2200/8015* (2013.01); *F02M 2200/8046* (2013.01); *Y10T 29/49401* (2015.01)

(58) Field of Classification Search
None
See application file for complete search history.

(56) References Cited

U.S. PATENT DOCUMENTS

| | | | | |
|---|---|---|---|---|
| 5,150,842 A | * | 9/1992 | Hickey | ............ B29C 45/14065 239/585.4 |
| 5,185,919 A | * | 2/1993 | Hickey | ............ B29C 45/14065 251/129.21 |
| 5,189,782 A | * | 3/1993 | Hickey | ............... F02D 41/3005 123/456 |

(Continued)

FOREIGN PATENT DOCUMENTS

| | | |
|---|---|---|
| CN | 1220723 | 6/1999 |
| DE | 10108464 | 9/2002 |

(Continued)

OTHER PUBLICATIONS

International Search Report for PCT/EP2012/058993, dated Aug. 8, 2012.

*Primary Examiner* — Edmund H Lee
(74) *Attorney, Agent, or Firm* — Norton Rose Fulbright US LLP; Gerard Messina

(57) ABSTRACT

A fuel injector, including a valve insert and a plug extrusion coating, is described, the valve insert including a valve sear and a valve housing. The valve housing has an alignment device, which is equipped to align the valve insert in an injection molding die, and the plastic extrusion coating has a second alignment device which is equipped to align the fuel injector during assembly in an internal combustion engine.

7 Claims, 2 Drawing Sheets

(56) References Cited

U.S. PATENT DOCUMENTS

| | | | | |
|---|---|---|---|---|
| 5,358,215 A | * | 10/1994 | Buth | B60G 17/0525 |
| | | | | 251/129.15 |
| 5,860,632 A | * | 1/1999 | Buth | B60G 17/0525 |
| | | | | 251/129.15 |
| 6,120,884 A | | 9/2000 | Igarashi et al. | |
| 6,186,421 B1 | | 2/2001 | Wahba et al. | |
| 6,302,340 B1 | | 10/2001 | Morton | |
| 6,325,049 B1 | * | 12/2001 | Nally | F02M 61/14 |
| | | | | 123/470 |
| 6,464,153 B1 | * | 10/2002 | Bonnah, II | F02M 51/0614 |
| | | | | 123/472 |
| 6,651,628 B2 | * | 11/2003 | Nally | F02M 61/14 |
| | | | | 123/470 |
| 7,377,040 B2 | * | 5/2008 | Hornby | F02M 51/0682 |
| | | | | 219/121.64 |
| 3,020,834 A1 | | 9/2011 | Ricco | |
| 8,020,834 B2 | * | 9/2011 | Ricco | F02M 47/027 |
| | | | | 239/585.1 |
| 2009/0291575 A1 | * | 11/2009 | Henry | H01F 7/06 |
| | | | | 439/89 |

FOREIGN PATENT DOCUMENTS

| | | |
|---|---|---|
| DE | 102006036106 | 2/2008 |
| JP | H0379913 | 8/1991 |
| JP | 2000337225 A | 12/2000 |

\* cited by examiner

FUEL INJECTOR

CROSS REFERENCE TO RELATED APPLICATIONS

The present application is a divisional application of U.S. patent application Ser. No. 14/130,244, filed Mar. 24, 2014, now U.S. Pat. No. 10,113,524, which is a National Phase of International Application, PCT/EP2012/058993, filed May 15, 2012, and claims priority to German Patent Application No. 10 2011 078 251.6, filed Jun. 29, 2011, all of which are hereby incorporated by reference in their entireties.

FIELD OF THE INVENTION

The present invention relates to a fuel injector as well as a method for producing such an injection valve.

BACKGROUND INFORMATION

Fuel injectors are known in different embodiments, in connection with internal combustion engines, for injecting fuel. In this connection, for each different internal combustion engine, a specific design has to be made of an injection jet of the fuel injector. This further raises the condition that the fuel injector be installed in the internal combustion engine with reference to its position. Up to now, this alignment has always taken place via torsional fixings which were applied on the fuel injector, mostly on the plug, and which enable position alignment. In this context, however, the assembly of the fuel injector is very effortful, since the alignment of the valve seat to the plug insertion during mounting takes place, for example, using a camera or indirectly on an external alignment area as transfer of the position. It would therefore be desirable to provide a fuel injector which particularly enables simple and more rapid mounting.

SUMMARY

By contrast, the fuel injector according to the present invention has the advantage that it is much simpler and quicker to install it. Compared to the related art, the production costs may be reduced for the fuel injector according to the present invention, in this context. According to the present invention, this is achieved in that the fuel injector, at a valve insert, has a valve housing, a first device for aligning the valve insert in an injection molding die. Furthermore, according to the present invention, the plastic extrusion coating has a second device for aligning, which is equipped to align the fuel injector during mounting on an internal combustion engine. Consequently, according to the present invention, depending upon the internal combustion engine, an injection molding die may be provided, a valve insert being situated in an aligned manner in the injection molding die based on the first alignment device on the valve housing. Subsequently, a plastic extrusion coating is injected particularly for the plug and additional outer plastic parts, if necessary, on the fuel injector. In this context, the second device is created for aligning on the plastic extrusion coating, so that, based on the previous alignment of the valve insert in the injection molding die, a jet path of the fuel injector is aligned, relative to the second device, for aligning on the plastic extrusion coating. Consequently, a fixed relationship is produced between the second alignment device and the valve seat, and with that, the jet path. Thus, to be sure, just as has been done up to now, an injection molding die has to be provided for each type of internal combustion engine, but then the assembly of the fuel injector is clearly able to be simplified. For the final assembly in the internal combustion engine, one then only has still to align the second alignment device protruding during assembly from the cylinder head on a component of the internal combustion engine, e.g. a rail, and mount it, in particular by welding it. Consequently, according to the present invention, a reference point is able to be created for aligning on the plastic extrusion coating at the lowest cost, which is individual depending on the internal combustion engine, so that, for each internal combustion engine, a specific jet alignment of the fuel injector is possible, similar valve inserts nevertheless being able to be used which are only inserted in various positions depending on the injection molding die.

The first device for aligning is preferably situated at an end region of the valve insert, adjacent to a valve seat. A particularly compact system of the device for aligning may be obtained thereby.

In an especially preferred manner, the device for aligning on a valve housing includes at least one first and one second area. The areas are to be produced simply as alignment devices and they make possible a rapid insertion of the valve insert in the injection molding die. Alternatively or in addition, the device for aligning includes projecting ribs or grooves and/or other projections.

In one particularly preferred manner, the first and second areas are arranged parallel to each other, in this instance. Alternatively, the two areas may be arranged to be at an angle, between the two areas a transitional edge being provided, in a particularly preferable manner.

Furthermore, the present invention relates to a method for producing fuel injectors, in a first step, a valve insert being provided having at least one first device for aligning the valve insert. Subsequently, the valve insert is introduced into an injection molding die, the valve insert being aligned in the injection molding die using the first alignment device. Then a partial molding of the valve insert using plastic takes place in such a way that the plastic extrusion coating has a second device for aligning. In the case of assembly of the fuel injector according to the present invention, the latter is then aligned at the second alignment for aligning, which is provided on the plastic extrusion coating. Consequently, during the plastic extrusion coating, a relationship is produced between the first alignment unit at the valve insert and the molded second alignment unit on the plastic extrusion coating, whereby the jet path of the fuel injector is defined by the insertion direction specified by the second alignment device.

In this context, the present invention may be used both for self-ignition and externally supplied ignition internal combustion engines.

DETAILED DESCRIPTION

Figure 1:
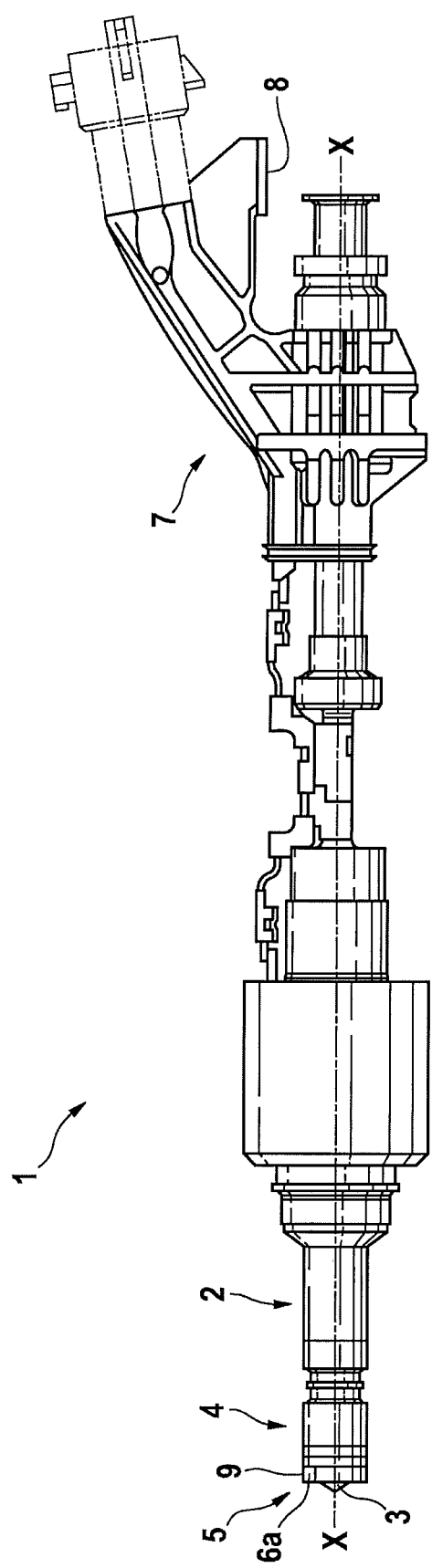
FIG. 1 a schematic side view of a aid injector according to a preferred embodiment of the present invention.

FIG. 1 shows schematically a fuel injector according to a preferred exemplary embodiment of the present invention. Fuel injector 1 includes a valve insert 2, which is able to be developed as a magnetic valve or a piezo valve, in a known manner. At one end of valve insert 2, a valve seat 3 is provided, on which an injection of fuel is carried out.

Fuel injector 1, according to the present invention, includes a plastic extrusion coating 7, which in this exemplary embodiment is a plug coating.

Figure 2:
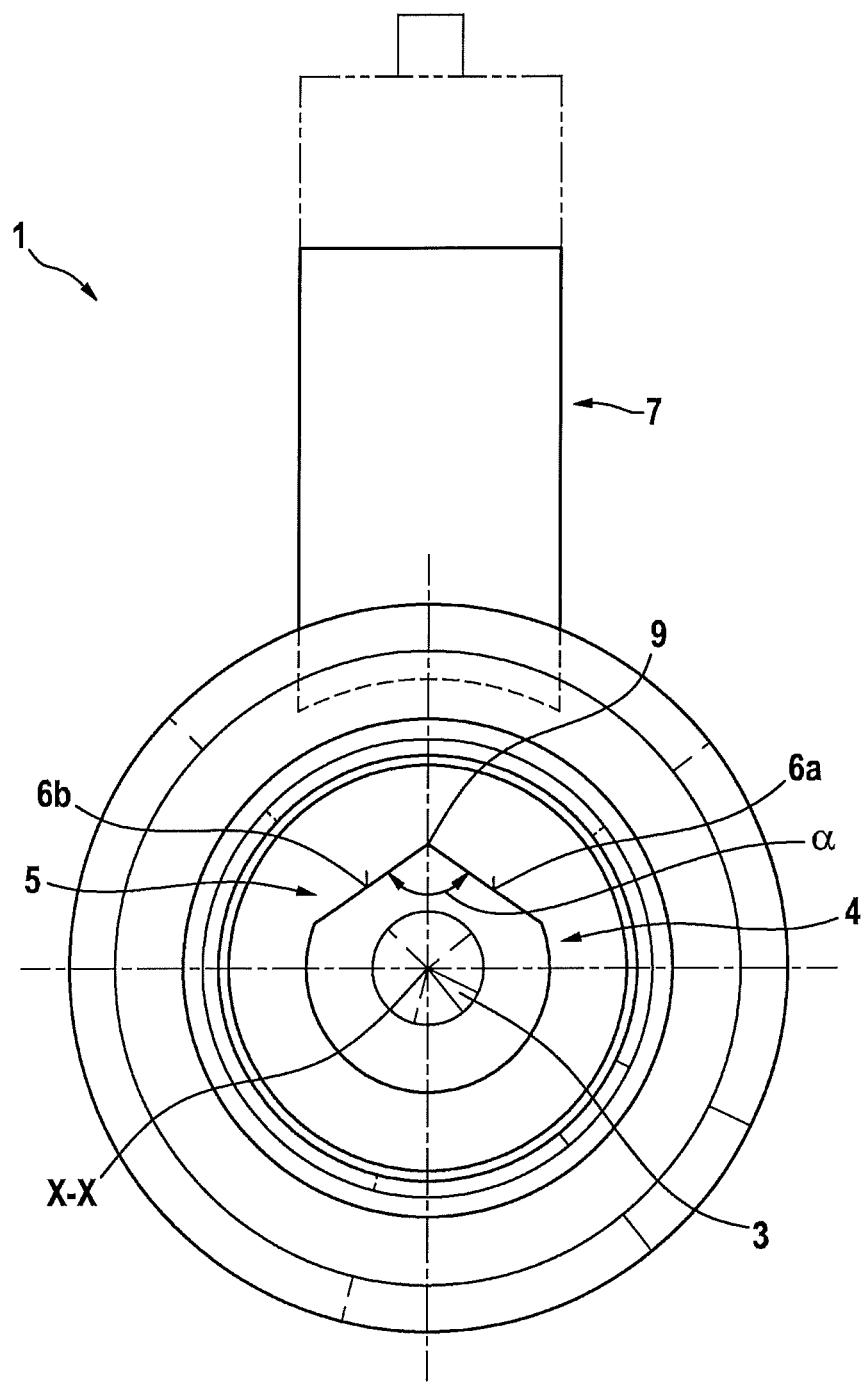
FIG. 2 shows a schematic view from in front of the fuel injector of FIG. 1.

As may particularly also be seen in FIG. 2, valve insert 2 has a valve housing 4, at whose outer side an alignment device 5 is provided adjacent to valve seat 3. Alignment device 5 includes a first area 6a and a second area 6b. The two areas 6a, 6b are situated at a predetermined angle ALPHA to each other and have a transitional edge 9 between them Moreover, at plastic extrusion coating 7, a second alignment device 8 is developed in the form of an additional area.

Now, according to the present invention, in the production of fuel injector 1, valve insert 2 is able to be inserted into an extrusion form using first alignment device 5, and the two areas 6a, 6b of alignment device 5 ensure that valve insert 2 is inserted in a predetermined alignment in the die mold. In a next step, plastic extrusion coating 7 is then sprayed onto valve insert 2, second alignment device 8 being sprayed on in the form of the area corresponding to the shape of the area. Consequently, it may be ensured by the molding process that the second alignment device 8 is aligned relative to valve insert 2.

Thus, according to the present invention, plastic extrusion coating 7 is able to be sprayed in the correct position on valve insert 2, so that in the subsequent insertion of the fuel injector into the internal combustion engine only an alignment to second alignment device 8 of plastic extrusion coating 7 is required. According to the present invention, one is particularly able to avoid a costly and long-drawn out alignment using a camera during assembly of the fuel injector. And yet, according to the present invention, no additional component is required, only, for each type of internal combustion engine, various die molds have to be kept in reserve, to make possible the appropriate alignment of the valve insert for the spraying process. Furthermore, according to the present invention, for various fuel injectors of different manufacturers, in each case the same valve inserts 2 may be used, which in each case are aligned individually in the various extrusion molds using first alignment device 5.

The invention claimed is:

1. A fuel injector, comprising:
a valve insert; and
a plug extrusion coating, wherein:
the valve insert includes a valve seat and a valve housing,
the valve housing includes a first alignment device equipped to align the valve insert in an injection molding die, and
the plastic extrusion coating includes a second alignment device equipped to align the fuel injector while the fuel injector is being assembled in an internal combustion engine,
wherein for assembly of the fuel injector in the internal combustion engine, only an alignment of the second alignment device is necessary,
wherein the second alignment device is provided on the plastic extrusion coating and protrudes during assembly from a cylinder head,
wherein, based on the alignment of the valve insert in the injection molding die, a jet path of the fuel injector is aligned, relative to the second alignment device for aligning on the plastic extrusion coating.

2. The fuel injector as recited in claim 1, wherein the first alignment device is situated at an end region of the valve insert adjacent to the valve seat.

3. The fuel injector as recited in claim 1, wherein the first alignment device includes at least one first area and one second area.

4. The fuel injector as recited in claim 3, wherein the first area is situated in parallel to the second area.

5. The fuel injector as recited in claim 3, wherein the first area is situated at an angle to the second area.

6. The fuel injector as recited in claim 5, wherein the first area and the second area have a transition edge between them.

7. The fuel injector as recited in claim 1, wherein the second alignment device includes an area.

\* \* \* \* \*